United States Patent [19]

Crowe

[11] Patent Number: 4,725,839
[45] Date of Patent: Feb. 16, 1988

[54] REMOTE, INDUCTIVELY COUPLED, TRANSDUCER INTERFACE

[75] Inventor: Wayne D. Crowe, Houston, Tex.

[73] Assignee: Ferranti Subsea Systems, Ltd., London, England

[21] Appl. No.: 684,762

[22] Filed: Dec. 21, 1984

[51] Int. Cl.$^4$ ............................................. G08C 19/06
[52] U.S. Cl. ............................. 340/870.31; 340/870.26
[58] Field of Search .......... 340/310 A, 310 R, 870.16, 340/870.18, 870.31, 870.32, 870.39; 376/119

[56] References Cited

U.S. PATENT DOCUMENTS

| | | |
|---|---|---|
| 1,991,658 | 2/1935 | Clark et al. |
| 2,172,918 | 9/1939 | Watts . |
| 2,415,364 | 2/1947 | Mounce . |
| 2,547,876 | 4/1951 | Krasnow . |
| 2,615,956 | 10/1952 | Broding . |
| 3,495,212 | 2/1970 | Brock . |
| 3,668,673 | 6/1972 | Adler . |
| 3,713,124 | 1/1973 | Durland ........................ 340/870.18 |
| 3,717,858 | 2/1973 | Hadden ........................ 340/870.39 |
| 3,824,857 | 7/1974 | Smith ........................... 340/870.18 |
| 4,001,798 | 1/1977 | Robinson . |
| 4,015,194 | 3/1977 | Epling . |
| 4,225,851 | 9/1980 | Reschovsky ................ 340/870.18 |
| 4,296,413 | 10/1981 | Milkovic . |
| 4,354,190 | 10/1982 | Reschovsky ................ 340/870.18 |
| 4,403,218 | 9/1983 | Beal ............................. 340/870.18 |
| 4,404,163 | 9/1983 | Bridges ............................. 376/119 |
| 4,455,555 | 6/1984 | Symonds et al. ............. 340/870.32 |

Primary Examiner—John W. Caldwell, Sr.
Assistant Examiner—Tyrone Queen
Attorney, Agent, or Firm—Norvell & Associates

[57] ABSTRACT

An exciter and detector circuit (A1, A2) is inductively coupled (18, 20) with a current conductor (B). The current conductor extends to a remote location at which it is inductively coupled (26, 30) with a remote transducer and encoder circuit (C1, C2). The exciter and decoder circuit supplies a square wave signal of a fixed frequency and amplitude across a primary winding (18) of the inductive coupler. After each half cycle of the square wave as the magnetic field in the inductive coupler is collapsing, a flyback voltage peak is generated which varies with the load applied to the current conductor. At the remote location, a voltage to frequency converter (40) converts variations in the output of the transducer into corresponding variations in a frequency signal. A load modulator (42) is connected with the voltage to frequency converter to apply a load to the rectifier at the frequency of the voltage to frequency converter. This causes the amplitude of the flyback voltage peaks to vary with an envelope frequency which is the same as the frequency of the voltage to frequency converter. A detector frequency to voltage converter (70) converts the envelope frequency into a voltage which varies in proportion to the envelope frequency, hence, to variations in the condition sensed by the transducer.

13 Claims, 9 Drawing Figures

REMOTE, INDUCTIVELY COUPLED, TRANSDUCER INTERFACE

BACKGROUND OF THE INVENTION

The present invention relates to telemetry systems for communicating information. The invention finds particular application in telecommunication systems for monitoring pressure and other conditions at submerged petroleum production equipment and will be described with particular reference thereto. It is to be appreciated, however, that the invention finds other applications in conjunction with monitoring conditions at remotely positioned transducers in other environments.

Heretofore, transducers have been used to monitor pressure, temperature, and other system variables. For accurate measurements in severe environments, instrumentation tubing commonly carried fluid from the severe environment to electronic monitoring instrumentation in a more hospitable location. However, the instrumentation tubing was vulnerable to damage and corrosion which could cause it to lose fluid to the environment.

Commonly, the remotely located monitoring instrumentation received power from and transmitted condition indicative signals to a central location. Many prior art systems used separate wires to provide electrical power to the monitoring instrumentation and to carry montored data from the instrumentation to the central location. However, others have suggested utilizing the same wire for both purposes. Although various techniques have been suggested for carrying the condition data on the power lines, such techniques commonly require ohmic paths connecting the remote monitoring instrumentation with the central power supply and condition display units. Such techniques are ineffective for transferring data across inductive couplings. For safety and ease of connection and disconnection, inductive couplings are standard in subsea installations. Both electrical power and instrumentation signals must be transferred across the inductive couplings.

The present invention contemplates a new and improved method and apparatus for conveying power and analog signals over a single pair of wires and across one or more inductive couplings.

SUMMARY OF THE INVENTION

In accordance with one aspect of the present invention, a telemetry system is provided for conveying power to a remote location and for returning data concerning monitored conditions at the remote location. An alternating current supply means provides an AC signal of a first frequency. A current conductor is inductively coupled with the AC supply to conduct the AC signal to the remote location. At the remote location, a remote transducer power supply means converts the AC signal received on the current conductor to operating electric power for a trandsucer. A variable load means selectively varies the electrical load connected wtih the current conductor. The variable load means is operatively connected with the current conductor at the remote location and with the transducer such that the transducer varies the electric load in accordance with a sensed condition. A load detection means is operatively connected with the current conductor to detect the variations in the electric load applied by the variable load means.

One advantage of the present invention is that it permits a single pair of wires to transfer both power and analog signals between a central controller and a remote transducer package.

Another advantage of the invention is that it enables the analog signals to be passed across series connected inductive coupling devices without the inductive coupling devices filtering out analog data.

Yet another advantage of the invention is that it enables analog signals representing precisely measured pressure, temperature, and other external conditions to be transferred from a remote, subsea transducer without losing precision.

Still further advantages and benefits of the present invention will become apparent to those of ordinary skill in the art upon a reading and understanding of the following detailed specification.

DETAILED DESCRIPTION OF THE DRAWINGS

The invention may take form in various parts or arrangements of parts, a preferred embodiment of which will be described in this specification and shown in the accompanying drawings which form a part hereof and wherein.

DETAILED DESCRIPTION OF THE PREFERRED EMBODIMENT

Figure 1A:
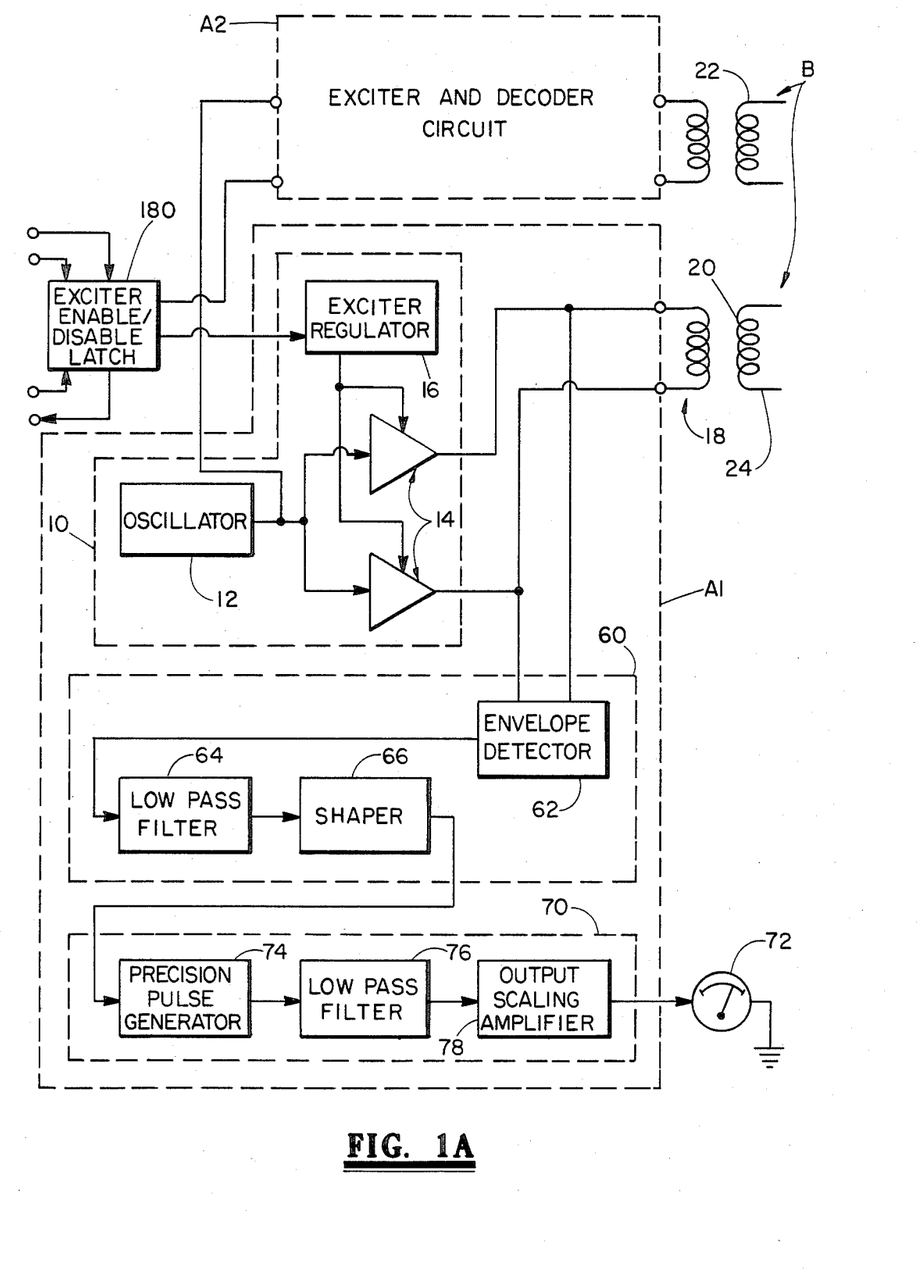
FIGS. 1A and 1B comprise a block diagram of a telemetry system formed in accordance with the present invention.
Figure 1B:
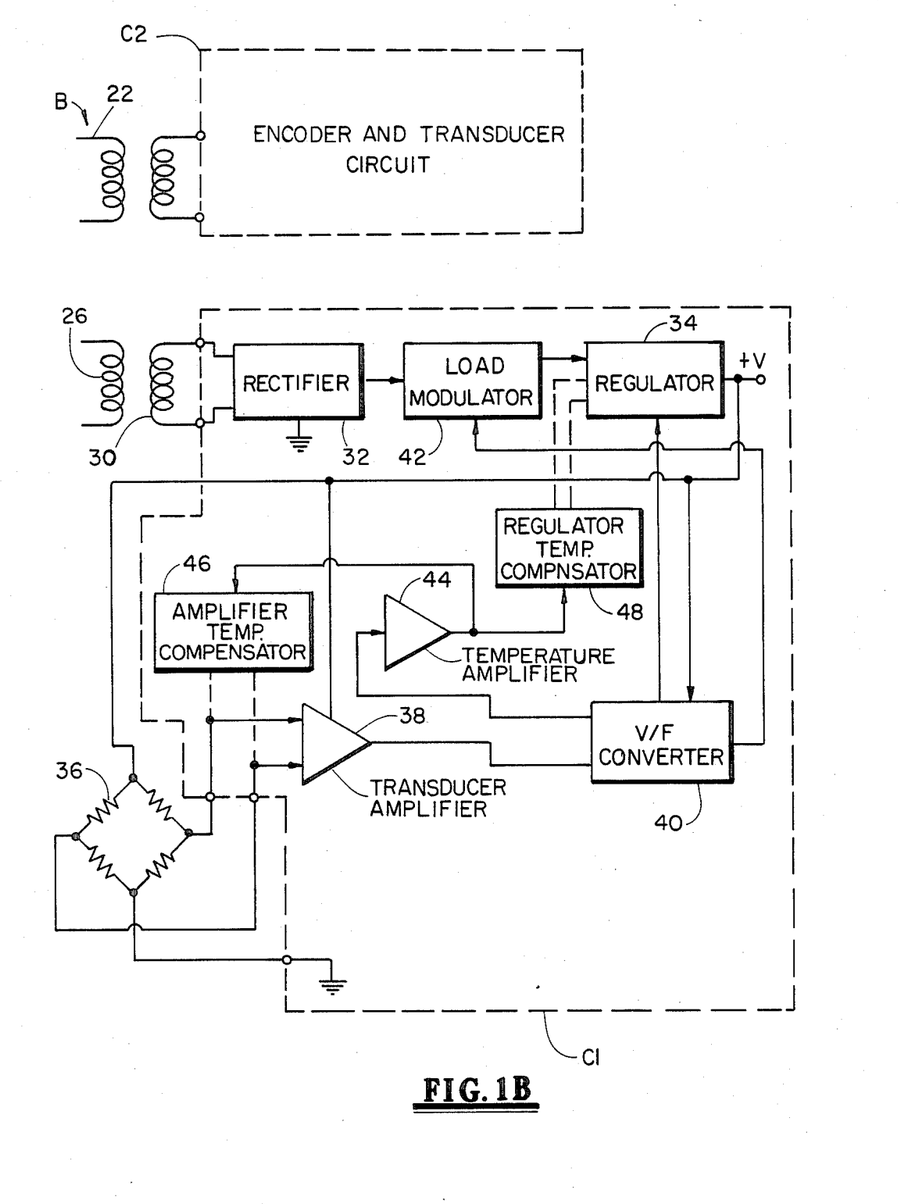

With reference to the drawings, which are for purposes of showing the preferred embodiment of the invention only and not for purposes of limiting same, FIGS. 1A and 1B show exciter and decoder circuits A1 and A2 inductively coupled with a current conductor B. At a remote location, the current conductor B is inductively coupled with encoder and transducer circuits C1 and C2.

Each exciter/decoder circuit A includes an exciter oscillator and driver circuit 10. More specifically, an oscillator 12 generates a first or drive frequency AC signal, about 6 kilohertz in the preferred embodiment. The first frequency is amplified by a push-pull amplifier 14 which converts the oscillator signal to square waves of opposite polarity with the first frequency and a substantially constant amplitude. An exciter regulator circuit 16 selectively enables and disables the push-pull amplifiers to permit the exciter oscillator and driver circuit to provide the first frequency driving signal across a primary winding 18 of an inductive coupling to the current conducting means B.

A secondary winding 20 is inductively coupled to the primary winding 18 such that the first frequency square wave signal is transferred to the current conductor B. The current conductor B includes a pair of wires 22, 24 which travel from the exciter/decoder circuit location to an inductive coupling winding 26 at a remote location.

With particular reference to FIG. 1B, at the remote location, an inductive coupling winding 30, which is inductively coupled with winding 26, transfers the square wave signal to the encoder/transducer circuit C1. A rectifier 32 rectifies the square wave, AC power signal to direct current, ie., to a DC power signal. A power supply means, such as a regulator 34, converts the DC signal to a fixed, preselected voltage which is appropriate for providing power to other components of the encoder and transducer circuit. The regulator circuit 34 applies the fixed, preselected voltage to a transducer 36, eg., a balanced bridge pressure transducer. Voltage variations across the balanced bridge transducer, which vary with changes in pressure, are amplified by a transducer amplifier 38 to scale the output voltage of the pressure transducer to an appropriate range for other circuit components.

A voltage to frequency converter 40 converts the voltage which varies in proportion to pressure into a frequency signal which varies with pressure over a preselected, variable frequency range. The variable frequency range is selected to be lower in frequency than the first or power oscillator frequency such that the transducer frequency signal is suitable for modulating the first frequency, square wave signal. The transducer frequency signal is connected with a load modulator or variable load means 42 which, in turn, is connected with the rectifier 32. The load modulator selectively varies the electrical load which is applied by the encoder/transducer circuit. For example, the load modulator circuit may include a load resistor which is selectively gated to ground in coordination with the transducer frequency signal. In this manner, the load drawn by the encoder/transducer circuit is equal to the fixed load drawn by the regulator circuit 34 to operate the transducer, the voltage to frequency converter, and the other circuit components, plus the varying load applied by the variable load means or load modulator 42. In this manner, the applied load varies with the condition monitored by the transducer.

In the preferred embodiment, the voltage to frequency converter 40 includes a temperature compensation circuit. A scaling amplifier 44 taps into the temperature compensation signal of the voltage to frequency converter and scales it to an appropriate amplitude. A temperature compensation circuit 46 injects a compensation signal into the input of the transducer amplifier 38 to compensate for first order temperature variations of the transducer 36, the transducer amplifier 38 and the voltage to frequency converter 40. In this manner, the frequency signal generated by the voltage to frequency converter 40 is substantially temperature independent. A regulator temperature compensation circuit 48 is interconnected with the voltage regulator 34 to compensate for temperature changes such that the regulated voltage remains substantially temperature independent.

Figure 2A:
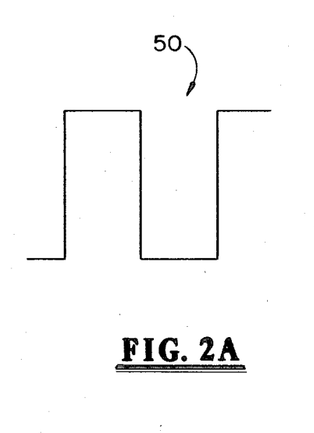
FIGS. 2A, 2B, and 2C illustrate electric wave forms in conjunction with transmission across the inductive coupling.
Figure 2B:
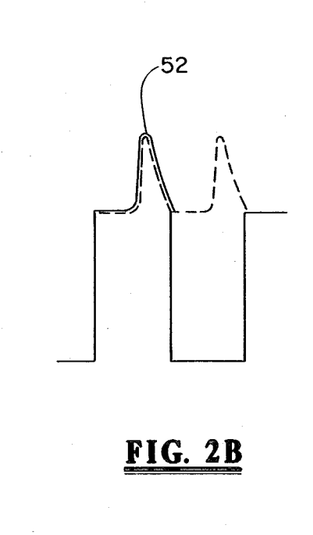
Figure 2C:
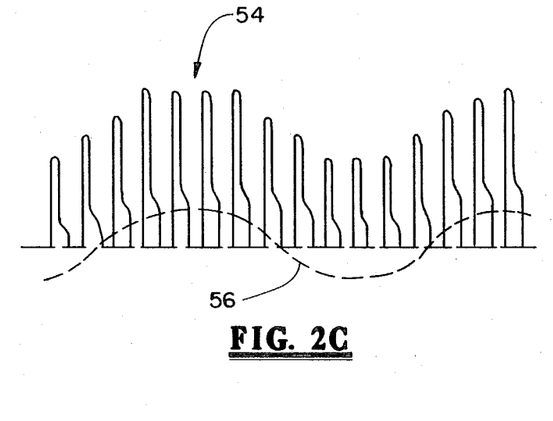

With reference to FIGS. 2A-2C, the output of the push-pull driver amplifier 14 which is applied across the primary inductive winding coil 18 is a fixed frequency, fixed amplitude, square wave 50, as illustrated in FIG. 2A. This square wave is the carrier for power transfer through the inductive couplers and is the predominant component in terms of energy content. As illustrated in FIG. 2B, each time the established magnetic field within the inductive coupler collapses, an inductive "flyback" voltage spike 52 occurs. The amplitude or energy content of each flyback voltage spike is dependent upon the load which is connected with the inductive coupler. The flyback voltage spikes have a greater amplitude or energy content when a smaller load is applied and a smaller amplitude or energy content when a larger load is applied. As illustrated in FIG. 2C, with the carrier square wave filtered out, a flyback voltage spike train 54 is produced. As the applied load is varied or modulated in proportion to the transducer frequency, the amplitude and energy content 56 of the flyback voltage spikes varies accordingly.

Referring again to FIG. 1A, the decoder portion of the exciter/decoder circuit A1 detects variations in the electrical load applied by the variable load or load modulator means by monitoring the corresponding variations in the amplitude and energy content of the flyback voltage. A load modulation detector 60 separates the flyback voltage peaks 52 from the square wave 50 and converts the flyback voltage peaks to an oscillating signal 56 which oscillates at the same frequency as the frequency at which the voltage to the frequency converter 40 applied the load. Specifically, an envelope detector 62 and low pass filter 64 separates the flyback voltage peaks from the square wave and converts them into the oscillating signal or envelope. A shaper 66 converts the envelope into a square wave whose frequency is the same as the voltage frequency converter 40 and which varies in proportion to the transducer output.

A frequency to voltage converter 70 converts the frequency signal to an appropriate scaled voltage to drive a meter 72 or other indicator of the condition sensed by the transducer 36. The frequency to voltage converter includes a precision pulse generator 74 which generates a fixed energy pulse in response to the rising edge of the square wave from the shaper 66. In this manner, the number of fixed energy pulses per unit time varies with the frequency of the received sine wave 56. A low-pass filter 76 filters out the frequency signal components, leaving only a DC voltage. An output scaling amplifier 78 scales the DC voltage to the appropriate voltage range for driving the meter 72.

Figure 3A:
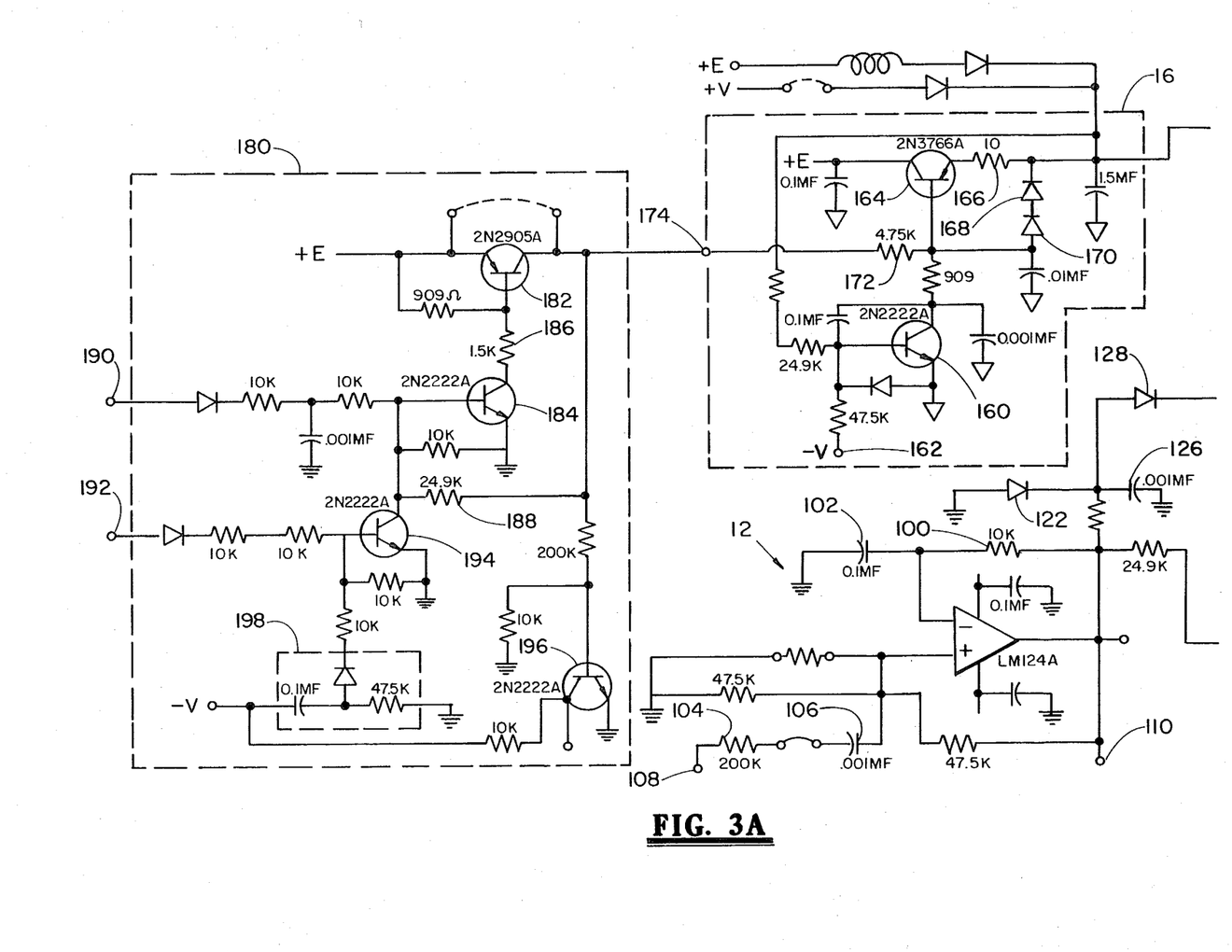
FIGS. 3A, 3B, and 3C comprise a circuit schematic for an exciter/decoder circuit formed in accordance with the present invention; and, FIG. 4 is a circuit schematic for a remote transducer encoder circuit formed in accordance with the present invention.
Figure 3B:
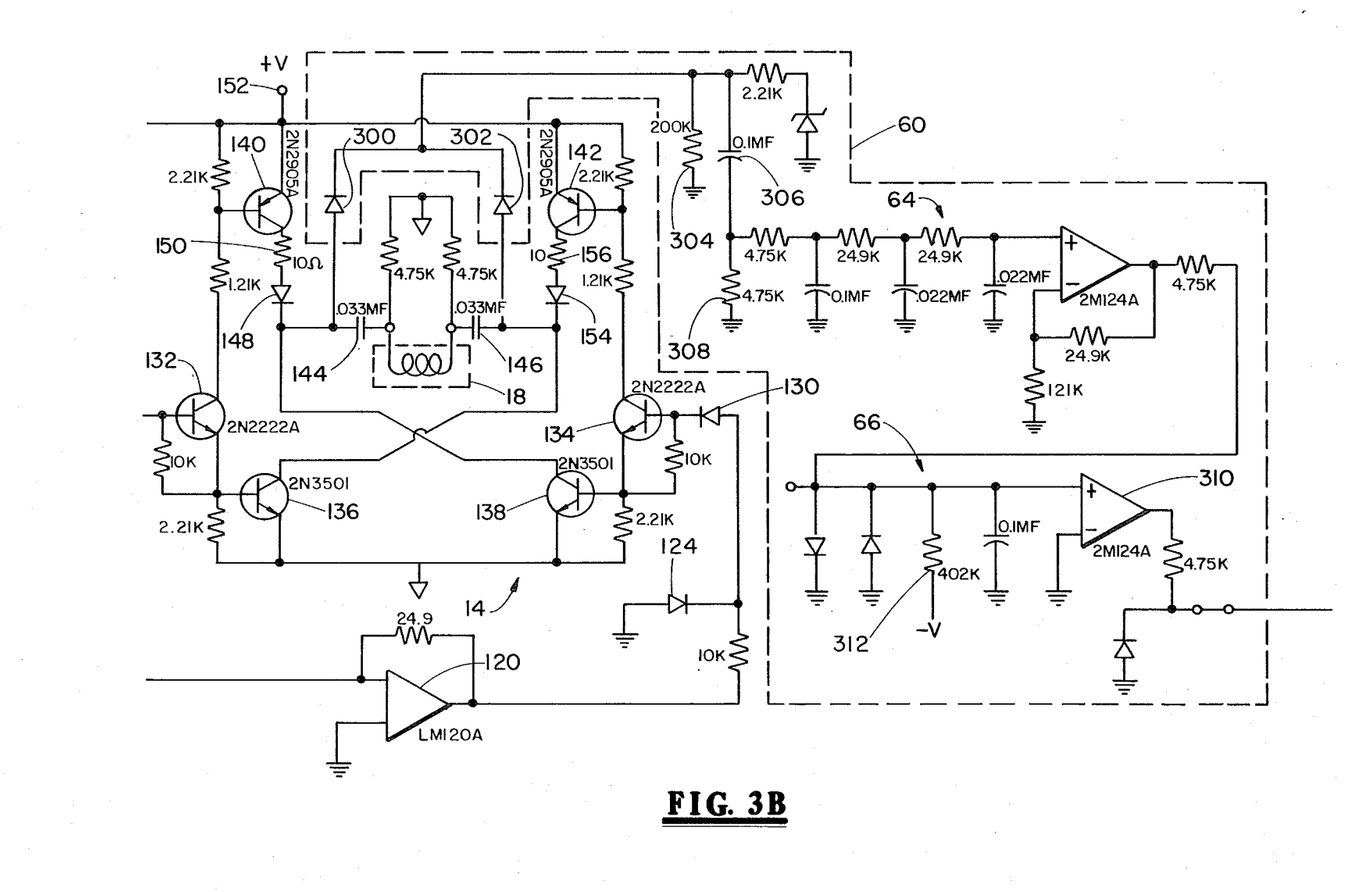
Figure 3C:
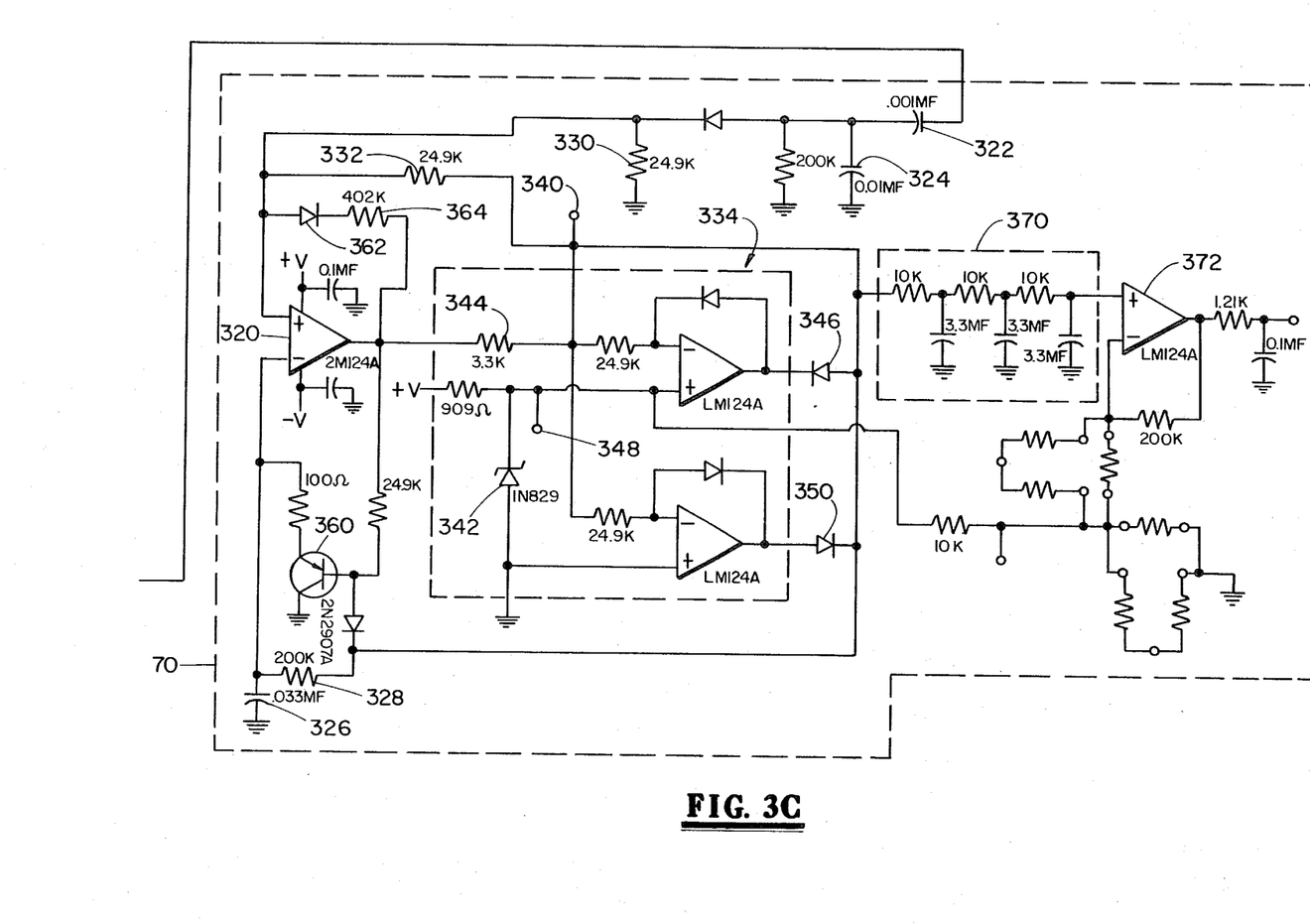

With reference to FIGS. 3A, 3B, and 3C, the exciter/driver circuit 10 of the preferred embodiment performs the functions of generating the 6 kilohertz AC drive signal, providing two-phase drive levels, and boosting current level. The oscillator 12 is an RC-type oscillator in which resistor 100 and capacitor 102 determine the frequency. An RC network 104, 106 connects the oscilator with terminals 108, 110 which are interconnected with the other exciter/decoders such that the oscillator 12 acts as a master oscillator for all the exciter/decoder circuits. This locks the frequency and minimizes interchannel interference.

With particular reference to FIGS. 3A and 3B, the push-pull driver 14 includes an inverter 120 for providing a 180° phase inversion. Diodes 122 and 124 convert the oscillator output into square waves of opposite polarity. A capacitor 126 compensates for the delay through the phase inverter to correlate the 180° out-of-phase portions of the square waves. The 180° out-of-phase square wave portions are symmetric about a ground or 0 voltage. Diodes 128 and 130 provide a small, positive minimum voltage level which must be attained before transistors 132 and 134 can be gated conductive. This assures that there is a short duration at each switching point of the 6 kilohertz square wave cycles in which neither side of the driver is "on". This guarantees that there is no overlap in the "on" cycles of the output drivers and promotes detection of the flyback voltages.

Transistors 132, 134 and transistors 136, 138, 140, 142 are arranged in an H-driver configuration. When transistor 132 is switched "on" as a result of the oscillator output being at a high level, its emitter-collector current passes into the bases of transistors 136, 140. During this cycle, there is a current flow from common through transistor 136, through the inductive coupling coil 18. This flow charges capacitors 144 and 146 such that their right terminals, in the orientation illustrated in FIG. 3, are biased negative. This current flow further flows through diode 148, resistor 150, and transistor 140 from a regulated exciter positive power supply terminal 152. During the opposite half of each cycle, the current flows through transistor 138, through capacitors 144, 146 charging them with the opposite polarity, through the inductive coupler winding 18 in the opposite direction, through diode 154, resistor 156, transistor 142, and the regulated exciter supply voltage terminal 152.

In this manner, an alternating current through the inductive coupler is generated which allows power to be transferred inductively to the inductive coupler secondary winding 20. The capacitors 144, 146 serve three purposes. First, they assure that the average DC current through the inductive coupler primary winding is zero and that saturation effects in the magnetic core are avoided. Second, in the event of a short circuit in the coupler primary, the short circuit current imposed on the driver circuit is limited. Third, they serve to set the resonance frequency of the capacitive-inductive circuit which they form with the primary winding 18 to a minimum level which will permit returning data signals from the associated remote encoder circuit to be readily detected over a wide range of coupler gaps.

With particular reference to FIG. 3A, the exciter regulator circuit 16 performs the function of allowing the level of the voltage supplied to the exciter drive circuit to be set independently of a main DC bus of the electronics assembly. A transistor 160 serves as an error amplifier comparing the regulated output voltage level at terminal 152 against the absolute value of the voltage supply received at a terminal 162. A transistor 164 functions as a main linear pass element. A resistor 166 and diodes 168 and 170 limit current to about 70 milliamps. The base driver input of main linear pass transistor 164 is provided through resistor 172 and terminal 174. The terminal 174 is connected with an exciter enable/disable latch 180 which commands the exciter supply voltage on and off.

The exciter enable/disable control circuit 180 selects which of the exciter circuits A1, A2 are to be enabled. In this manner, control over the level of power consumed by module electronic assemblies is controlled. In system configurations with multiple control modules being powered by a common power distribution circuit, the power level associated with the exciter circuit can range from 65 milliwatts to 1.6 watts per channel, in the preferred embodiment, with a 32 volt bus level.

The exciter enable/disable latch 180 includes a main switching transistor 182 which is controlled by a latch formed between the transistor 182, a transistor 184 and associated latching path resistors 186 and 188. Terminals 190 and 192 receive inputs from command decoding gates located on a command logic printed circuit board. Positive going pulses are used to control the latch in response to housekeeping-type commands by supplying current into the base of the transistor 184 for setting the latch. The positive going pulses are also used for shunting latching current through resistor 188 away from the base of transistor 184 through a reset transistor 194 to reset the latch. The status of the latch is made available ot a control panel through transistor 196. A power-on reset network 198 assures that the exciter circuits are disabled/off on initial turn-on of the modules. This occurs whenever a down link communications carrier is detected by the module modem circuits. Control of the individual exciter circuits is implemented by supplying base drive current for the respective main linear pass transistor 164 of the exciter circuits through terminal 174. When the latch is reset, the output voltage to terminal 174 remains at zero and no supply voltage is available to the exciter/driver due to the lack of base current to the main linear pass transistors 164.

Figure 4:
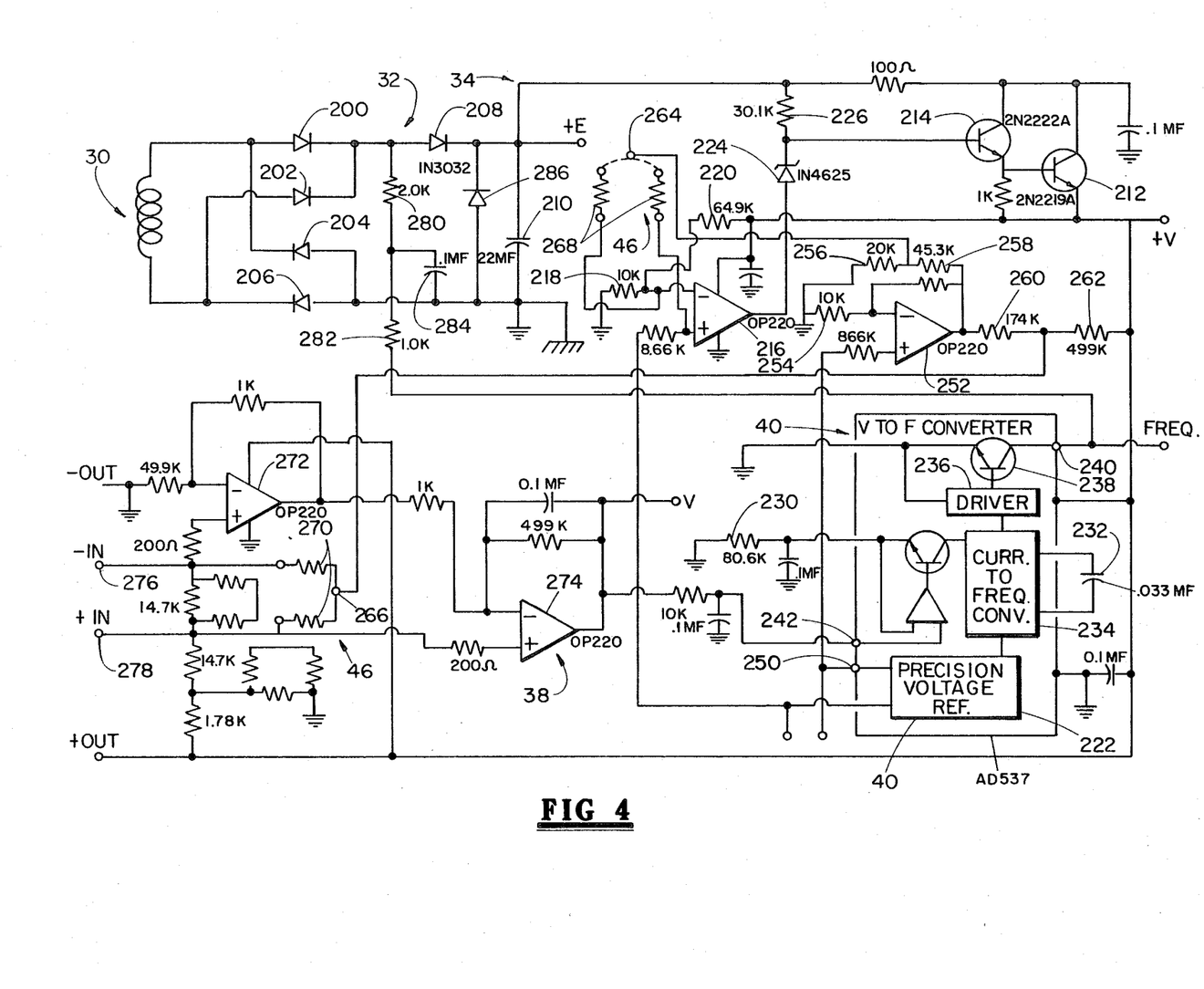

With reference to FIG. 4, the remote transducer/encoder circuits C1, C2 allow a pressure transducer, or other transducer, to be located at or very near the point of pressure pick-off from the tubing or piping of interest. Moreover, the circuit enables the transducer to be connected electrically with excitation and signal processing circuitry in an associated control or data monitoring module via an electric cable and inductive signal couplers.

The rectifier 32 includes diodes 200, 202, 204, and 206 arranged in a full wave diode bridge. A diode 208 connects the rectifier with a filter capacitor 210 of regulator 34. A transistor 212 and its drive transistor 214 function as a series pass element of a linear voltage regulator. An operational amplifier 216 serves as an error amplifier. A portion of the regulator circuit output voltage at the emitter of transistor 212 is fed to a negative input of the error amplifier 216 by way of resistors 218 and 220. The error amplifier compares the voltage fed back from transistor 212 with a nominal one volt reference. The one volt reference is derived from a precision voltage reference circuit 222 which is a part of the circuit chip containing the voltage to frequency converter 40. The amplified error voltage from error amplifier 216 is coupled through a Zener diode 224 to the base of the driver transistor 214.

The actual drive current to the base of drive transistor 214 is derived from the unregulated DC power received from the rectifier through resistor 226. This provides the starting current to the circuit for allowing the one volt reference voltage to be generated initially. The error amplifier and Zener diode circuit thereafter regulate the output voltage by shunting the excess current through the resistor 226 to common. In this manner, the Zener diode 224 provides the required voltage offset to the base of driver transistor 214 for maintaining the regulator output voltage substantially constant.

A capacitor 232 is a timing capacitor for a current to frequency oscillator 234. The current to the oscillator 234 is a function of the voltage at input pin 242 and the value of resistor 230. The signal from the current to frequency converter is conveyed to a driver circuit 236 and a gating transistor 238 which provides a square wave output signal at pin 240. The frequency of the square wave at pin 240 varies in proportion to the input voltage which is applied to an input pin 242. In the preferred embodiment, the input voltage from the pressure transducer is in the range of +2 to +2.8 volts and the nominal frequency at pin 240 is in the range of 75 hertz to 105 hertz.

In addition to temperature compensated regulated voltage, the precision voltage reference circuit 222 also produces an output signal on pin 250 which varies in proportion to the temperature. The analog temperature voltage signal is amplified by an amplifier 252. The amplified temperature voltage signal from amplifier 252, in the preferred embodiment, is scaled to 1 millivolt per degree Kelvin, and ranges from approximately 0.273 volts to 0.373 volts for a 0° C. to 100° C. temperature range. A resistor network, including resistors 254, 256, 258, 260, and 262, is arranged such that the voltage at a pin 264 varies between 0.8 volts and 1.1 volts as a voltage at an output pin 266 varies between 3.5 volts and 4.0 volts. The voltages available at pins 264 and 266 are analogs of the temperature sensed by the precision voltage reference circuit 222. A portion of the temperature signal is fed to the voltage regulator error amplifier 216 through temperature compensation resistors 268. The magnitude or slope of the correction is inversely proportional to the value of resistors 268. Resistors 270 interconnect the temperature varying voltage at pin 266 with the input of amplifiers 272 and 274 which form two stages of transducer amplifier 38.

The use of two amplification stages to amplify the transducer signal received at terminals 276 and 278 enable a relatively high amplification to be achieved. In the preferred embodiment, an amplification of better than 45 to 1 is achieved such that a transducer output in the range of 17 millivolts can be amplified to the 2 to 2.8 volt level which pin 242 is calibrated to receive.

The millivolt range transducer output is thus amplified to the 2 to 2.8 volt range and converted by the voltage frequency converter 40 into an oscillating signal in the 75 to 105 hertz range. The square wave output from the voltage to frequency converter has a 50% duty cycle in the preferred embodiment. As a simplification, the on/off pattern of the square wave varies the current from the rectifier 32 through resistors 280 and 282 between two levels. The size of resistors 280 and 282 are selected such that this current variation is approximately 20% of the total current consumed by the encoder circuit and the transducer. The resistor 280 and a capacitor 284 sreve to prevent high frequency components associated with the 6 kilohertz excitation signal from reaching and interfering with the low level signals in the circuit components of the transducer encoder circuit, particularly the voltage to frequency converter circuit chip.

The effect which the 75 to 105 hertz modulation has on the power input and data output terminals is a function of the interaction between the exciter/driver stage and the intervening inductive coupler. As discussed above, the amplitude of the flyback voltage generated at the exciter/driver terminals across the primary winding 18 contains an envelope which corresponds to the modulating 75 to 105 hertz frequency.

With particular reference to FIG. 3B, the decoder for decoding the envelope and recovering the modulating frequency has an input via diodes 300 and 302. The diodes 300, 302 allow positive peaks of the wave form occurring at the driver terminals to appear across a resistor 304 and by way of a capacitor 306 across a resistor 308. This wave form is a composite of the three components discussed above in conjunction with FIGS. 2A, 2B, and 2C. The primary component is the 6 kilohertz square wave driver signal which has a peak-to-peak amplitude of about 16 to 24 volts.

The second component, the inductive flyback voltage, occurs as the magnetic field within the coupler core collapses twice per cycle, once through each of diodes 300, 302. The rate at which the flyback voltage can develop and its peak value is determined primarily by capacitors 144, 146. The capacitor 306 serves as a DC blocking capacitor such that the voltage across the resistor 308 is esentially the flyback wave form of FIG. 2C with the DC component removed.

The third component is the variation in the average energy content of the flyback voltage which occurs in the same frequency range as the output of the voltage to frequency converter 40. During the low portion of the signal, transistor 238 (FIG. 4) is open and the voltage induced during the flyback across the primary winding 18 is clamped by the voltage on capacitor 210 and a diode 286 (FIG. 4). When transistor 238 is "on", the current drawn by resistors 280 and 282 reduces the amplitude of the flyback peak as sensed by diodes 300, 302 of the decoder circuit (FIG. 3B). The modulated flyback peaks have a residual frequency of 12 kilohertz which is passed through the low-pass filter 64 to the shaper 66. An amplifier 310 acts as a discriminator and a resistor 312 provides a small negative bias current to eliminate spurious output in the absence of a legitimate modulated signal.

With particular reference to FIG. 3C, the frequency to voltage converter 70 converts the 75 to 105 hertz modulating frequency to a corresponding voltage, in the preferred embodiment in the range of 0 to 5 volts. The frequency to voltage converter integrates the constant width and constant height voltage pulses which it receives from the shaper 66. An amplifier 320 functions as a comparitor for a pulse generator. It is triggered to its high state by the positive going edge of the variable frequency square wave which is received from capacitors 322 and 324. Once set to its high state, the duration of a pulse is determined by the time it takes for a capacitor 326 to be charged through resistor 328 to the level at which the comparitor will reset to the low state. This occurs when the voltage at one of the amplifier 320 inputs becomes greater than the voltage at the other. The voltage at the amplifier other input is set by resistors 330 and 332 in conjunction with a precision clamp circuit 334. The precision clamp circuit functions as if a perfect Zener diode were connected at its cathode to a terminal 340 and its anode to ground. A reference Zener diode 342 which is temperature compensated limits the voltage range at terminal 340 to a range equal to the voltage which develops thereacross. Current passing through a resistor 344 is shunted across a diode 346 to a negative voltage supply when the voltage at terminal 340 tries to go more positive than the voltage across the reference Zener diode at terminal 348. Likewise, when the output of amplifier 320 goes negative and when the voltage at terminal 340 tries to go more negative than the common level at the anode of the reference diode 342, current from resistor 344 is shunted by way of diode 350 to the positive voltage supply. In this manner, the voltage at terminal 340 is precisely clamped.

Complete and consistent resetting of the charge on the time constant capacitor 326 in the time period between pulses is insured by transistor 360. A diode 362 and a resistor 364 improve the noise immunity of the pulse generator by providing a small offset voltage at one input of amplifier 320 that must be overcome before triggering of the pulse occurs.

Because the precision clamp 334 closely controls the voltage levels at terminal 340, the current fed to the timing capacitor 326 through resistor 328 is very precise. Correspondingly, the switching level of the comparitor determined by resistors 330, 332 is closely controlled. Pulses occurring at terminal 340 are very stable with respect to pulse width and voltage. Therefore, a high degree of precision can be obtained when the pulse train at 340 is integrated by a low-pass filter 370. In the preferred embodiment, the low-pass filter has an approximate time constant of 200 milliseconds. It provides a worst case attenuation of the monitored frequency of 50 db. and a worse case delay of 2 seconds to reach 99.9% of the reading.

An amplifier 372, and associated gain and offset resistors, normalize the voltage to the 0 to 5 volt range in proprtion to an input frequency in the range of 75 to 105 hertz.

The invention has been described with reference to the preferred embodiment. Obviously, modifications and alterations will occur to others upon a reading and understanding of the foregoing detailed description. It is intended to include all such modifications and alterations insofar as they come within the scope of the appended claims or the equivalents thereof.

Having thus described the invention, it is now claimed:

1. A telemetry system for transmitting information from a remote location, the system including alternating current supply means for applying a square wave voltage signal of a first selected frequency, a current conductor operatively connected with the alternating current supply means for conducting the square wave voltage signal to the remote location, at least one inductive coupler having a primary and a secondary winding in series with the current conductor for inductively transmitting the square wave voltage signal from first to second portions of the current conductor, a transducer at the remote location for generating an output indicative of a remote condition sensed by the transducer, and power converter means adjacent the remote location and operatively connected with the current conductor for converting the square wave voltage signal to electrical power for powering the transducer, the system further comprising:

load modulator means for selectively varying the electrical load applied to the current conductor, the load modulator means being operatively connected with the current conductor at the remote location and with the transducer to vary the electrical load in accordance with the output of the transducer;

load detection and means operatively connected with the primary winding of the at least one inductive coupler for detecting the magnitude of repeatedly varying flyback voltage spikes across the primary winding in response to repeated collapse of the magnetic field within the inductive coupler during transition of the square wave voltage signal, the magnitude of the each flyback voltage spike being related to the magnitude of the varying electrical load applied by the load modulator means; and condition detection means responsive to the frequency of an amplitude envelope of the repeatedly varying flyback voltage spikes for generating a signal indicative of the output of the transducer.

2. The telemetry system as set forth in claim 1 wherein the load modulator means applies an oscillating load which is varied over a variable frequency range in accordance with the transducer output, the variable frequency range being lower than the first selected frequency of the square wave voltage signal.

3. The telemetry system as set forth in claim 2 wherein the load detection means includes an envelope detector for removing the first frequency square wave voltage signal and providing an oscillating signal indicative of the frequency of the amplitude envelope of the repeatedly varying flyback voltage spikes.

4. The telemetry system as set forth in claim 3 wherein the condition detection means further includes a frequency to voltage converter for converting the oscillating signal indicative of the frequency of the amplitude envelope of the repeatedly varying flyback voltage spikes to a DC signal whose magnitude varies in proportion to the transducer output.

5. The telemetry system as set forth in claim 1 further including a rectifier operatively connected with the inductive coupler at the remote location for rectifying the square wave voltage signal, and wherein the power supply means and the load modulator means are operatively connected with the rectifier.

6. The telemetry system as set forth in claim 5 wherein the transducer output has a voltage magnitude indicative of the remote condition sensed by the transducer.

7. The telemetry system as set forth in claim 6 wherein the load modulator means includes:

a voltage to frequency converter for converting the transducer output voltage to a frequency signal and a fixed electrical load operatively connected between the voltage to frequency converter and the rectifier such that the applied load varies with the frequency signal and in accordance with the condition sensed by the transducer.

8. A telemetry system for providing power to a remotely disposed transducer and for receiving data indicative of a condition monitored by the transducer over a single pair of conductors, the telemetry system comprising:

an oscillator for producing a first AC signal of a first frequency;

a driver operatively connected with the oscillator for converting the oscillating signal to a square wave voltage of fixed amplitude;

an inductive coupler in series with the pair of conductors for inductively transmitting the square wave voltage from first to second portions of the pair of conductors; into a frequency signal which varies in proportion to the transducer output;

a load modulator operatively connected wtih the converter for applying a varying load to the pair of conductors and having a frequency in accordance with the converter frequency, the amplitude of each flyback voltage spike across the primary winding being related to the magnitude of the applied load at the remote location; and, detector means operatively connected with the primary winding for deriving a signal indicative of the frequency of the series of repeatedly varying flyback voltage spikes and thus the condition monitored by the transducer.

9. The telemetry system as set forth in claim 8 further including a display means for producing a man-readable display which varies in proportion to the detected frequency such that the display is indicative of the condition sensed by the transducer, the display means being operatively connected with the detector means.

10. The telemetry system as set forth in claim 9 wherein the detector means further includes a voltage to frequency converter for converting the detected frequency to a voltage which varies in proportion to the frequency for powering the display means.

11. A method of providing power to a remote transducer and transmitting information on a condition monitored by the transducer over a common current conductor, the method comprising:

generating an AC signal of a first frequency;

inductively coupling the first frequency signal to the current conductor;

at the remote location, converting power from the first frequency signal on the current conductor into appropriate electric power to power the transducer and other electronic circuit components;

converting an output of the transducer into a frequency signal whose frequency varies in proportion to changes in the condition monitored by the transducer;

applying a varying load to the current conductor at the remote location with the periodicity of the frequency signal;

detecting the magnitude of repeatedly varying flyback voltage across the inductive coupling as a magnetic field produced therein collapses after each half cycle of the AC signal, the magnitude of each flyback voltage varying in accordance with the varying load applied at the remote location; and, monitoring variations in the flyback voltage magnitude to determine the frequency with which the repeatedly varying flyback voltage magnitude is varying, which determined frequency is indicative of the transducer frequency and thus the condition monitored by the transducer.

12. The method as set forth in claim 11, further comprising:

converting the determined frequency to a DC signal whose magnitude varies in proportion to the transducer output.

13. The method as set forth in claim 12, further comprising:

providing a man-readable display indicative of the DC signal whose magnitude varies in proportion to the transducer output.

* * * * *